(12) United States Patent
Kim et al.

(10) Patent No.: US 7,526,039 B2
(45) Date of Patent: Apr. 28, 2009

(54) METHOD FOR DECIDING SIGNAL DETECTION ORDER IN MOBILE COMMUNICATION SYSTEM

(75) Inventors: Kyeongyeon Kim, Seoul (KR); Chungyong Lee, Seoul (KR); Jae-Hak Chung, Seoul (KR); Seijoon Shim, Seoul (KR); Seung-Hoon Nam, Seoul (KR)

(73) Assignees: Samsung Electronics Co., Ltd (KR); Yonsei University (KR)

( * ) Notice: Subject to any disclaimer, the term of this patent is extended or adjusted under 35 U.S.C. 154(b) by 556 days.

(21) Appl. No.: 11/075,347

(22) Filed: Mar. 8, 2005

(65) Prior Publication Data

US 2005/0195914 A1 Sep. 8, 2005

(30) Foreign Application Priority Data

Mar. 8, 2004 (KR) .................. 10-2004-0015560

(51) Int. Cl.
H04B 7/02 (2006.01)
H04L 1/02 (2006.01)

(52) U.S. Cl. .................. 375/267; 375/260; 375/259; 375/349

(58) Field of Classification Search .......... 700/53, 700/28, 1; 375/219–223, 341, 259–260, 375/265, 267, 295, 299, 316, 346–349; 455/39, 455/63.1, 68–69
See application file for complete search history.

(56) References Cited

U.S. PATENT DOCUMENTS

2003/0128658 A1 * 7/2003 Walton et al. ............... 370/208

2004/0083082 A1 * 4/2004 Onggosanusi et al. ......... 703/2

FOREIGN PATENT DOCUMENTS

EP 1 337 082 8/2003

OTHER PUBLICATIONS

Wolniansky et al., V-BLAST: An Architecture for Realizing Very High Data Rates Over the Rich-Scattering Wireless Channel, 1998 IEEE, pp. 295-300.

(Continued)

*Primary Examiner*—Shuwang Liu
*Assistant Examiner*—James M Perez
(74) *Attorney, Agent, or Firm*—The Farrell Law Firm, PC

(57) ABSTRACT

Disclosed is a method for deciding a signal detection order in a mobile communication system that supports an adaptive modulation technology. The detection order that maximizes a channel, in which a product of the minimum symbol distance for each modulation rate and the effective SINR becomes minimum, maximum is selected by obtaining the effective SINR and performing a bit allocation with respect to the detection orders of each detection order, and thus an average error probability can be minimized. In the case in which the number of antennas is increased, the detection orders of all the possible cases are not considered, but the detection order that maximizes the channel, in which the product of the minimum symbol distance for each modulation rate and the effective SINR becomes minimum, is selected with respect to a forward ordering and a reverse ordering.

6 Claims, 4 Drawing Sheets

OTHER PUBLICATIONS

Ng et al., Iterative Bit & Power Allocation for V-BLAST Based OFDM MIMO System in Frequency Selective Fading Channel, 2002 IEEE, pp. 271-275.

Kim et al., Adaptive Modulation for MIMO Systems with V-BLAST Detection, 2003 IEEE, pp. 1074-1078.

Elders-Boll et al., "On the Influence of Substream Ordering for MIMO Decision-Feedback Detectors with Higher Order Modulation", 2002 IEEE, pp. 691-695.

Ng et al., "A Simplified Bit Allocation for V-BLAST based OFDM MIMO Systems in Frequency Selective Fading Channels", 2002 IEEE, pp. 411-415.

* cited by examiner

METHOD FOR DECIDING SIGNAL DETECTION ORDER IN MOBILE COMMUNICATION SYSTEM

PRIORITY

This application claims priority to an application entitled "Method for Deciding Signal Detection Order in Mobile Communication System" filed in the Korean Industrial Property Office on Mar. 8, 2004 and assigned Ser. No. 2004-15560, the contents of which is hereby incorporated by reference.

BACKGROUND OF THE INVENTION

1. Field of the Invention

The present invention relates to a method for deciding on the order of a signal detection in a mobile communication system, and more particularly to a method for deciding on the order of a signal detection in a mobile communication system that supports an adaptive modulation technology.

2. Description of the Related Art

Typically, unlike a wired channel environment, a wireless channel environment exhibits a low reliability due to multi-path interference, shadowing, radio wave attenuation, time-domain noise, interference, etc. These factors obstruct the heightening of a data transmission rate in mobile communications. Many technologies have been developed to overcome these problems. These representative technologies consist in part of an error control coding technology for suppressing a signal distortion and the influence of noise, and an antenna diversity for overcoming a fading phenomenon.

The antenna diversity receives a plurality of signals that suffer an independent fading phenomena and adjusts for the fading phenomena. The antenna diversity may be classified into time diversity, frequency diversity, multipath diversity, space diversity, etc. The time diversity temporarily obtains the diversity by combining a channel coding and interleaving, and the frequency diversity obtains the diversity by the passing signals transmitted with different frequencies through different multipaths. The multipath diversity obtains the diversity by dividing the multipath signals using different fading information. The space diversity obtains the diversity by using independent fading signals using a plurality of antennas in a transmitter, a receiver, or both the transmitter and receiver. The space diversity uses an antenna array.

However, the error control coding technology and the diversity used for the wireless channels cannot comply with the demand for high-rate data services such as Internet connection and multimedia services. For this, the frequency efficiency should be increased. Mobile communication systems having an antenna array have now been researched in order to increase the frequency efficiency.

The antenna array system is a system in which a transmitter/receiver includes multiple antennas and which uses a spatial domain for increasing the frequency efficiency. Since the time domain and spatial domain have already been limited, a higher transmission rate can easily be obtained by using the spatial domain. The antennal array system includes a system called a 'V-BLAST (Vertical Bell Lab LAyered Space Time)' or 'space division multiplexing' system proposed by Bell Labs. This antenna array system basically corresponds to a MIMO (Multi Input Multi Output) system in which independent information is sent through respective antennas.

In order to extend the channel capacity so that the antenna array system has a high frequency efficiency, correlation coefficients from among channels formed among transmitting antennas and receiving antennas should be small. If the correlation coefficients among the channels are small, respective information transmitted from the respective transmitting antennas pass through the different channels, and thus mobile stations can distinguish between the transmitted information. If the signals sent from the respective transmitting antennas have the different spatial characteristics, they can be distinguished from one another, and this makes it possible to extend the channel capacity. Additionally, the antenna array system is suitable in an environment where many multipath signals having the different spatial characteristics exist. However, in a LOS (Line Of Sight) environment, the channel capacity of the antenna array system is not greatly increased compared to a single transmitting/receiving antenna system. Accordingly, the antenna array system is suitable to the environment where many multipaths are produced due to scattering objects located between the transmitter and the receiver, i.e., to the environment where respective transmitting/receiving antenna channels have small correlation coefficients or have diversity effects.

If the antenna array is used in the transmitter/receiver, the channel capacity is increased. In this case, the channel capacity is determined, based in part on whether the transmitter/receiver obtains the channel information transmitted from the transmitter to the receiver. If both the transmitter and the receiver have received the channel information, the increase of the channel capacity becomes greatest, while if the transmitter/receiver have not received the channel information, the increase of the channel capacity becomes least. If only the receiver receives the channel information, the increase of the channel capacity is in the middle of the two values as described above. In order for the transmitter to determine the channel information, the transmitter can estimate the channel state or feed the information back to the transmitter so that the transmitter can recognize the channel state.

The channel information required in the antenna array system is a channel reaction among the respective transmitting antennas and the respective receiving antennas, and increases in proportion to the number of transmitting/receiving antennas. The antenna array system that includes the multiple transmitting/receiving antennas has an increased channel capacity in proportion to the number of antennas being used in the transmitter/receiver. The antenna array system has the advantage in that it can increase the channel capacity in proportion to the number of transmitting/receiving antennas. However, it also has the disadvantage that in the case in which the channel information should be fed back, the amount of feedback information is increased according the increase of the number of antennas. In order to solve this problem, a method for increasing the channel capacity by reducing the feedback information is required.

As described above, as the conventional receiving method in the SM-MIMO (Spatial Multiplexing Multiple Input Multiple Output) system, an architecture for removing an interference signal using the V-BLAST (Vertical Bell Lab LAyered Space Time) has been proposed. The V-BLAST architecture is an interference removing architecture that increases the performance of the respective antennas' preferential detection and removes channels having large SINRs (Signal to Interference pulse Noise Ratios) using an SIC (Successive Interference Cancellation) in the system having an equal power and equal modulation rate. This architecture is called a "forward ordering detection architecture". This forward ordering detection architecture is described in detail in P. W. Wolniansky, G. J. Foschini, G. D. Golden and R. A. Valenzuela, "V-BLAST: An Architecture For Achieving Very High Data Rates Over The Rich-Scattering Wireless Channel", *Proc. Int.Symp.Signals, Systems, Electronics*, pp. 295-300, October 1998.

An SM-MIMO system employing an AM (Adaptive Modulation) architecture has recently been developed in order to increase the channel capacity by increasing the data transmission rate. In such a system, the existing forward ordering detection architecture is not effective in error probability. This is because since a high-degree modulation rate is used in a channel having a large SINR, a channel having a greater SINR may produce a higher error probability. In the case of performing an optimal bit allocation and power allocation, the detection order is selected in a direction in which the total SINRs are increased by preferentially detecting and removing the channels having small SINRs. This is called a "reverse ordering detection architecture". The reverse ordering detection architecture is described in detail in Ka-Wai Ng, Roger S. Cheng, and Ross D. Murch, "Iterative Bit & Power Allocation for V-BLAST based OFDM MIMO System in Frequency Selective Fading Channel", *Proc. IEEE WCNC.*, vol. 1 pp. 271-275, March 2002, and Young-Doo Kim, Inhyoung Kim, Jihoon Choi, Jae-Young Ahn, and Yong H. Lee, "Adaptive Modulation for MIMO Systems with V-BLAST Detection" *IEEE VTC spring*, Vol 2, pp 1074-1078, April 2003.

First, the forward ordering detection architecture described in Wolniansky will be explained.

The forward ordering detection architecture is an architecture that first selects a sub channel having the maximum SINR at respective steps, and is suitable where the sub channels have equal power and equal modulation rates. However, the forward ordering detection architecture is not suitable where to there are errors in the adaptive modulation rate. Specifically, in the case of using the adaptive modulation architecture, although a higher-degree modulation architecture should be applied to a channel having a greater SINR, the minimum symbol distance becomes shorter as the degree of the adaptive modulation architecture becomes higher, and this causes a higher error probability at the equal SINR. Accordingly, a lower error probability cannot be guaranteed although the SINR becomes higher.

Second, the reverse ordering detection architecture described in Ng and Kim will be explained.

The reverse ordering detection architecture has been proposed in a system in which the respective sub channels have adaptive power and adaptive modulation architectures. In Ng, the error probability is limited, and bits and powers are allocated in a direction in which the total transmission power is minimized in a state in which the total bits have been allocated. In this case, the detection order in which the transmission power become minimum when the bits and powers are allocated with respect to all the detection orders. In Kim, an architecture for maximizing the total effective SINRs and a reverse ordering for obtaining the similar performance with a simpler process with respect to the detection orders of all the possible cases have been proposed. However, the architecture proposed in Kim can improve the performance only if a discrete optimal bit loading that is known as a "Campello's algorithm" is used. The Campello's algorithm allocates the power to the side in which the necessary power is smallest and increases the bits if one more bit is given. Accordingly, the modulation architectures of all the cases can be used, and, in a system in which the feedback of the allocated power is well performed, the smallest average error probability is obtained if the total effective SINRs are large.

However, in the actual system, the kind of the modulation architectures and the amount of feedback information are limited. Additionally, since this architecture has a larger amount of feedback information with respect to the power in comparison to the modulation architecture, it is preferable in practical use to adjust the rate only with the power kept constant. In this case, however, the respective transmitting antennas show similar performances in error probability with respect to the forward ordering suitable to the system in which the respective transmitting antennas have the equal power and the equal modulation rate, and the reverse ordering suitable to the system that performs the optimal bit loading. This is because the conventional technologies described in Wolniansky and Kim decide the detection order on the basis of the effective SINRs, but the actual error probability cannot be decided only by the effective SINRs.

Since the above-described forward and reverse ordering detection architectures take into consideration only the effective SINRs in the case of performing SIC, they are not efficient in minimizing the average error probability decided by the minimum symbol distances according to the modulation rates and the received SINRs.

FIG. 1 illustrates the construction of the SM-MIMO system for the forward ordering architecture and the reverse ordering architecture.

Referring to FIG. 1, the conventional SM-MIMO system adopting the AM scheme detects the signal by sub-streams using the V-BLAST architecture. In this case, an effective SIR and bit loading calculation unit uses the forward ordering or the reverse ordering according to an SIR (Signal to Interference Ratio) of the channel. In order for the effective SIR and bit loading calculation unit to decide the optimal detection order, the architecture that uses the forward ordering and the architecture that uses the reverse ordering are expressed by the equations illustrated in FIG. 1. The architecture using the forward ordering assumes that the EP (Equal Power) and the ER (Equal Rate) are used. The architecture using the reverse ordering assumes that the PA (Power Allocation) and the AR (Adaptive Rate) are used. The effective SIR and bit loading calculation unit transfers the optimal detection order decided by the architecture that uses the forward ordering or the reverse ordering to a V-BLAST unit, and thus the signals are received through a plurality of antennas by the detection order.

In summary, if the equal power and the equal modulation rates are used, the conventional SM-MIMO system adopting the V-BLAST architecture has a simple structure and a small amount of feedback information. If the power allocation and the adaptive rate are used, the conventional SM-MIMO system adopting the V-BLAST architecture approximates a theoretical capacity, but it has a large amount of feedback information with a complicated structure.

SUMMARY OF THE INVENTION

Accordingly, the present invention has been designed to solve at least the above and other problems occurring in the prior art, and an object of the present invention is to provide a method for deciding a signal detection order in a mobile communication system that efficiently remove interference components as a small amount of feedback information.

Another object of the present invention is to provide a method for minimizing an error probability irrespective of a bit loading algorithm by using both the minimum symbol distance according to a modulation rate and an SINR (Signal to Interference pulse Noise Ratio) that are parameters considered in obtaining an actual error probability.

Still another object of the present invention is to provide a method for deciding a detection order that simultaneously considers the minimum symbol distance according to a modulation rate and a received SINR in order to decide an efficient detection order in an SM-MIMO system having an adaptive modulation rate.

Still another object of the present invention is to provide an architecture for deciding an improved detection order in comparison with the conventional architecture in obtaining an average error probability.

Still another object of the present invention is to provide a method for deciding a detection order that has a performance approximating a case where a power allocation and an adaptive modulation rate are used with a small amount of feedback information using an equal power and adaptive modulation rate in an SM-MIMO system that uses a V-BLAST architecture.

In order to accomplish the above and other objects, there is provided a method for deciding a signal detection order in an SM-MIMO (Spatial Multiplexing Multiple Input Multiple Output) system using an equal power and adaptive modulation rate for a plurality of antennas including the steps of obtaining effective SINRs (Signal to Interference pulse Noise Ratios) for all possible detection orders, and selecting from among the detection orders a detection order that maximizes a channel, in which a multiplication of a minimum symbol distance for each modulation rate and the effective SINR becomes minimum through a bit allocation.

Preferably, if the number of antennas is increased, the detection order that maximizes the channel, in which the multiplication of the minimum symbol distance for each modulation rate and the effective SINR becomes minimum, is selected with respect to the forward order and the reverse order from among the detected orders.

In another aspect of the present invention, there is provided an apparatus for receiving signals in an SM-MIMO (Spatial Multiplexing Multiple Input Multiple Output) system using an equal power and adaptive modulation rate for a plurality of antennas, including an effective SIR (Signal to Interference Ratio) and bit loading calculation unit for sequentially inputting all possible detection orders, obtaining an effective SINRs (Signal to Interference pulse Noise Ratios) for each transmitting antenna based on the input detection orders, and selecting from among the detection orders the detection order that maximizes a channel, in which a multiplication of a minimum symbol distance for each modulation rate and the effective SINR becomes minimum through a bit allocation, and a V-BLAST (Vertical Bell Lab LAyered Space Time) unit for receiving the signals through the plurality of antennas in accordance with the detection order selected by the effective SIR and bit loading calculation unit.

In still another aspect of the present invention, there is provided a method for deciding a signal detection order in an SM-MIMO (Spatial Multiplexing Multiple Input Multiple Output) system using an equal power and adaptive modulation rate for a plurality of antennas, including the steps of calculating reference values for transmitting antennas for all possible detection orders, selecting the smallest reference value from among the reference values calculated for the transmitting antennas for the respective detection orders, selecting the largest reference value from among the reference values selected corresponding to the respective detection orders, and deciding the detection order for which the selected reference value is obtained as the final detection order.

In still another aspect of the present invention, there is provided an apparatus for receiving signals in an SM-MIMO (Spatial Multiplexing Multiple Input Multiple Output) system using an equal power and adaptive modulation rate for a plurality of antennas, including an effective SIR (Signal to Interference Ratio) and bit loading calculation unit for calculating reference values for transmitting antennas for all possible detection orders, selecting the smallest reference value from among the reference values calculated for transmitting antennas for the respective detection orders, and deciding the detection order for which the largest reference value from among the reference values selected corresponding to the respective detection orders is obtained as the final detection order, and a V-BLAST (Vertical Bell Lab LAyered Space Time) unit for receiving the signals through the plurality of antennas in accordance with the detection order decided by the effective SIR and bit loading calculation unit.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
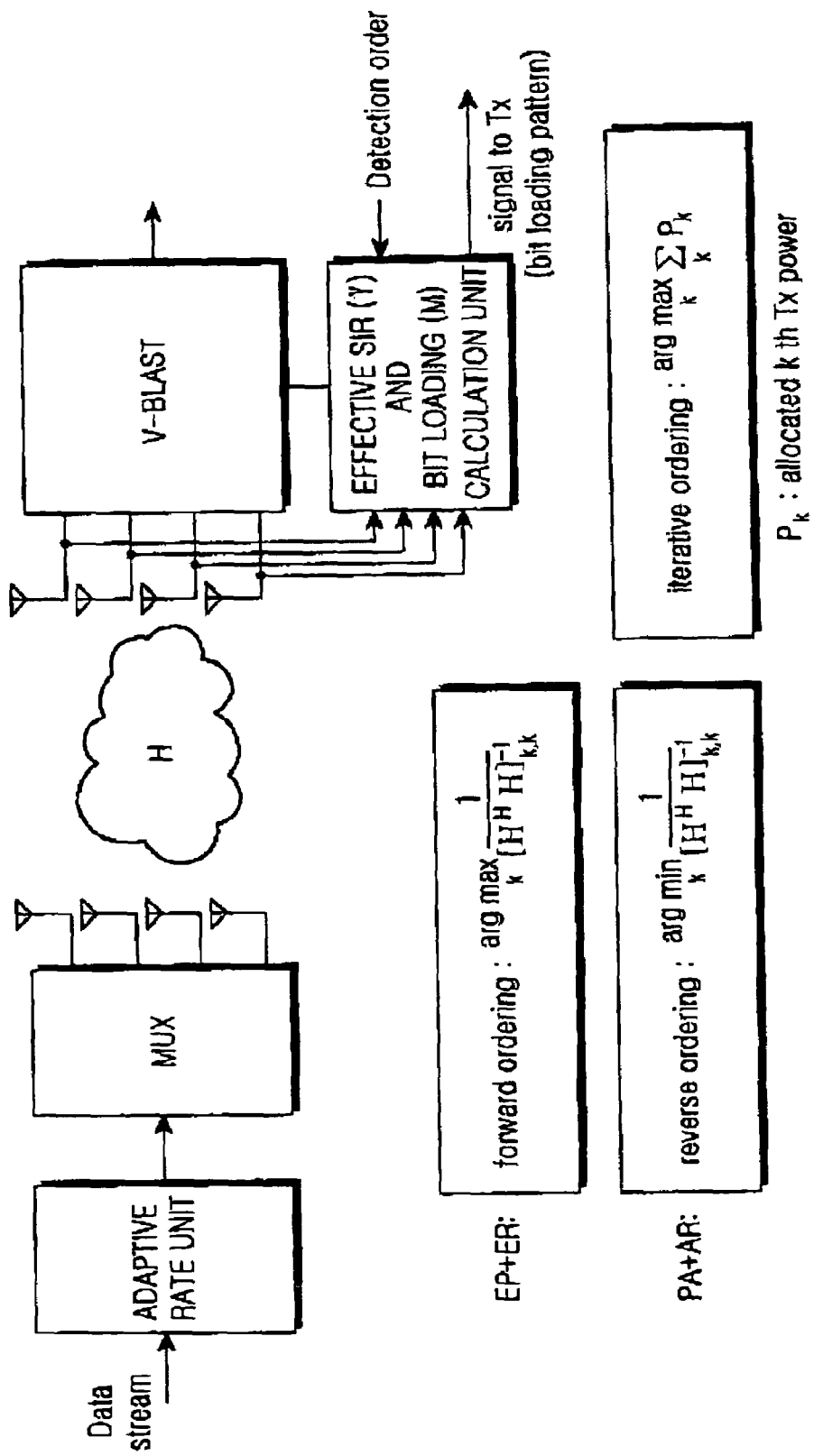
FIG. 1 is a view illustrating the construction of a transmitter/receiver that decides the detection order in an SM-MIMO system using the conventional adaptive modulation/demodulation architecture.

Preferred embodiments of the present invention will be described in detail hereinafter with reference to the accompanying drawings. In the following description of the present invention, a representative embodiment of the present invention will be explained in order to accomplish the above-described objects of the present invention. Other embodiments that can be proposed according to the present invention will be explained in the detailed description of the preferred embodiments. Additionally, a scheme for deriving a generalized equation for deciding an optimal detection order and a construction for deciding an optimal detection order through the generalized equation will be explained in detail in the detailed description of the preferred embodiments.

In the embodiments of the present invention, a scheme for selecting the detection order that minimizes an error rate of a channel having the largest error probability will be explained in detail since the channel that mostly affects an average error probability is the largest channel. For this, in deciding the optimal detection order in the embodiments of the present invention, not only a received SINR but also the minimum symbol distance according to the modulation rate are considered. That is, the detection order having the minimum average error probability is selected according to the received SINR and the minimum symbol distance according to the modulation rate. For this, effective SIRs and modulation rates of the respective transmitting antennas (or channels) are decided by detection orders. Then, products are obtained of the minimum symbol distances according to the modulation rates decided by transmitting antennas (or channels) and the effective SINRs, and the detection order for which the largest number of transmitting antennas (or channels) having the minimum value from among the multiplied values is selected. This is referred to as an optimal detection order. If the signal is received by the optimal detection order selected as above, the average error probability can be minimized. Additionally, by applying the method for deciding the optimal detection order proposed in the embodiments of the present invention to a system that uses an equal power and adaptive modulation rate, the performance approximating a system that uses a power allocation and an adaptive modulation rate can be obtained with a small amount of feedback information.

A. Scheme for Deciding an Optimal Detection Order

A scheme for deriving a generalized equation for minimizing an average error probability that is represented by a multiplication of a minimum symbol distance according to a modulation rate and an effective SINR will be explained.

Typically, the average bit error probability $P_{b,k}$ can converge into an exponential function within an error range of 1 dB or less. This is expressed by Equation (1).

$$P_{b,k} \cong C \exp(-g_{M,k} \cdot SINR_k) \qquad (1)$$

Here, C denotes a constant, k an index of the transmitting antenna, and M a modulation order. Also, $g_M$ denotes a constant corresponding to the minimum symbol distance given according to the modulation rate, and $SINR_k$ denotes an effective SINR. As can be seen from Equation (1), the average bit error probability is in proportion to the product of the minimum symbol distance given according to the modulation rate and the effective SINR.

The term '$g_M$' can be expressed by Equation (2) in the case in which the modulation rate is Mary PSK or square Mary QAM.

$$g_{PSK} = \sin^2\left(\frac{\pi}{M}\right), \quad g_{S-QAM} = \frac{1.5}{M-1} \qquad (2)$$

In Equation (2), if Mary PSK is applied as the modulation rate, M may have a value of "2". Also, if square Mary QAM is applied as the modulation rate, M may have a value of "16".

$SINR_k$ in Equation (1) may be considered as the product of an SNR $\rho/r$ due to a transmission power and a noise for each channel, and an SIR $\gamma_k$ due to a channel. This can be expressed by Equation (3)

$$SINR_k = \frac{\rho}{r} \gamma_k, \quad \gamma_k = \frac{1}{[(H^H H)^{-1}]_{k,k}} \qquad (3)$$

Here, $\rho$ is equal to $P_T/\sigma^2$, which implies the total SNR, and r is the effective number of substreams which load at least one bit. Referring to Equation (3), if the respective channels have an equal power, the SNR of the respective channel becomes $\rho/r$, which is obtained by dividing the total SNR by the effective number of substreams which load at least one bit.

If the SIC is performed in order to obtain $\gamma_k$ by Equation (3), channels H for the already detected signals are excluded from consideration. For example, in the case in which a channel matrix H is expressed by two column vectors $\underline{h}_1, \underline{h}_2$ as shown in Equation (4) in the case of using two transmitting/receiving antennas, the effective SIR $\gamma_k$ for the respective transmitting antenna can be expressed by Equation (5) in a zero forcing receiver.

$$H = [\underline{h}_1, \underline{h}_2] \qquad (4)$$

$$\gamma_k = \frac{1}{[(H^H H)^{-1}]_{k,k}} \quad k = 1, 2 \qquad (5)$$

For example, if the effective SIR corresponding to the signal transmitted from the first transmitting antennas from among the two transmitting antennas is selected, the channel matrix of the signal transmitted from the remaining transmitting antenna and the effective SIR can be expressed by Equation (6).

$$\hat{H} = [\underline{h}_2], \quad \gamma_k = \frac{1}{\left[(\hat{H}^H \hat{H})^{-1}\right]_{k,k}} \quad k = 2 \qquad (6)$$

In the example as described above, it is assumed that the detection order is made in a manner where the effective SIR of the signal from the first transmitting antenna is measured first, and then the effective SIR of the signal from the second transmitting antenna is measured. It may also be possible that the effective SIR of the signal from the second transmitting antenna is measured first, and then the effective SIR of the signal from the first transmitting antenna is measured.

Since the effective SINRs for the respective channels appear differently as the detection orders are changed, the modulation rates transmitted to the respective channels appear differently according to the decided detection orders. According to the present invention, in order to reduce the actual error probability, the effective SINRs are obtained with respect to all of the possible detection orders, and the number of bits allocated by the channels is searched for. At that time, the average error probability is given by Equation (7).

$$P_b \cong \frac{C}{r} \sum_k \exp(-g_{M_{ik}} \cdot SINR_{ik}) \le C \exp(-g_{M_{iK}} \cdot SINR_{iK}) \; K = \qquad (7)$$

$$\text{index of the smallest}(g_{M,k} \cdot SINR_k)$$

Here, i is an index of the detection order, and when the number of transmitting antennas is $M_T$, $M_T!$ indicates are produced.

In Equation (7), the minimization of the average error probability may correspond to the maximization of $g_{M_{iK}} \cdot SINR_{iK}$. Since the total SNR $\rho$ is not a value that is changed according to the detection order, the total SNR can finally be expressed by Equation (8).

$$\max_{i(\text{detection order})} \left( \min_{k(T \times \text{antenna})} \frac{g_{M_{ik}} \gamma_{ik}}{r_i} \right) \qquad (8)$$

Equation (8) is a generalized equation that decides the detection order for minimizing the average error probability. As described above, according to the present invention, the detection order that makes the channel, in which the product of the minimum symbol distance $g_{M_{ik}}$ for each modulation rate and the effective SINR $SINR_{ik}$ is minimized, a maximized value is selected by obtaining the effective SINR and performing a bit allocation with respect to the detection orders of all the possible cases. By selecting the detection order as above, the average error probability can be minimized. Additionally, in the case in which the number of antennas is increased, the detection orders of all the possible cases are not considered, but the detection order that makes the channel, in which the product of the minimum symbol distance $g_{M_{ik}}$ for each modulation rate and the effective SINR $SINR_{ik}$ is minimized, a maximum value is selected with respect to the forward ordering and the reverse ordering.

B. Apparatus for Deciding an Optimal Detection Order

The apparatus for deciding an optimal detection order according to an embodiment of the present invention sequentially inputs all of the possible detection orders, and measures the modulation rates and the effective SIRs of the transmitting antennas by the detection orders. Then, the apparatus decides the optimal detection order by Equation (7). Then, by transferring the decided optimal detection order to the V-BLAST unit, the signals from the transmitting antennas are received so that they have the minimized average error probability.

Figure 2:
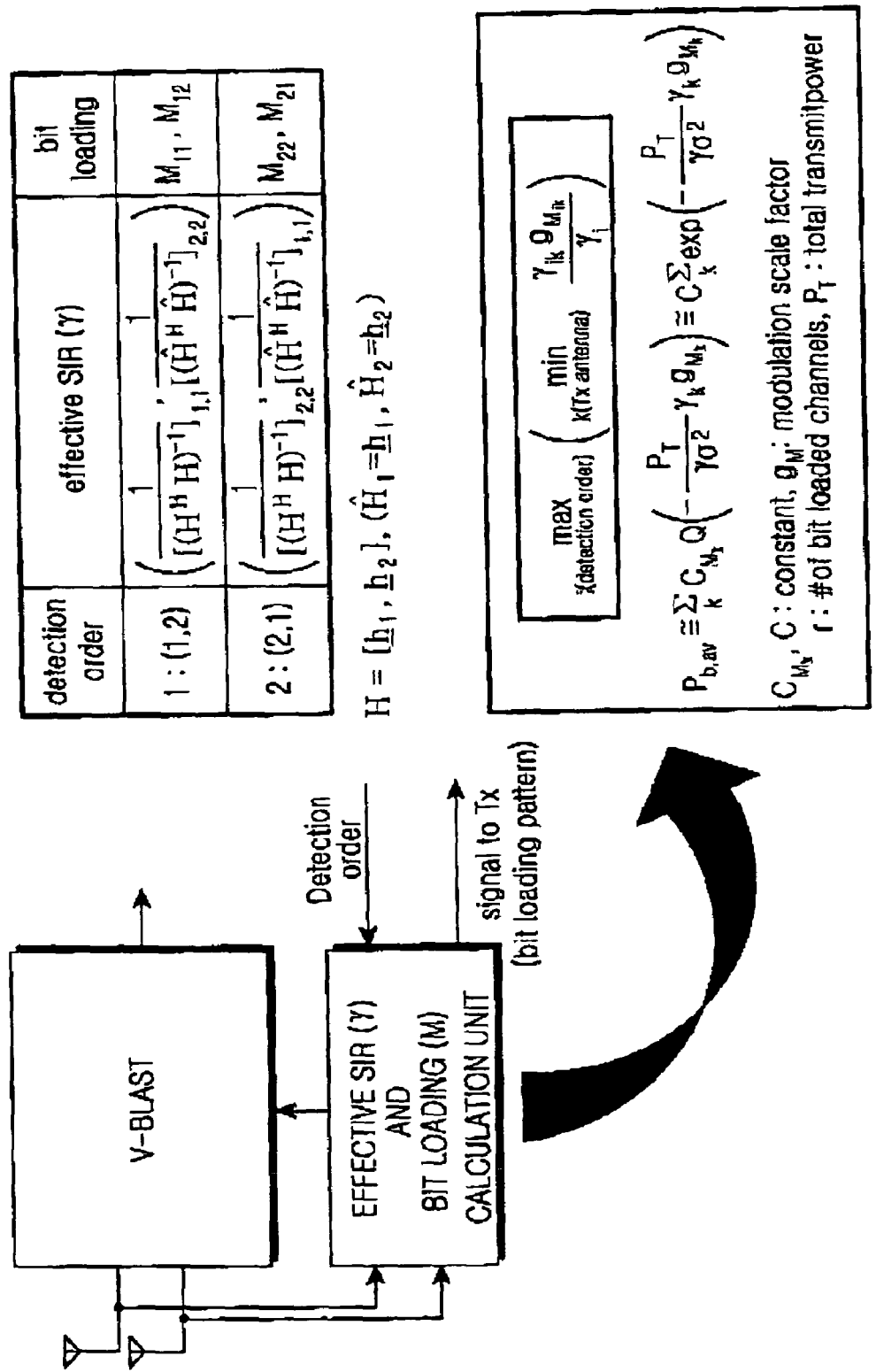
FIG. 2 is a view illustrating the construction of a transmitter/receiver that decides the detection order in an SM-MIMO system using an adaptive modulation/demodulation architecture according to an embodiment of the present invention.

FIG. 2 illustrates the construction of a multi-antenna receiver for obtaining the minimum average error probability according to an embodiment of the present invention.

Referring to FIG. 2, signals received through a plurality of antennas are input to a V-BLAST unit. The V-BLAST unit detects the input signals by sub-streams using the V-BLAST architecture by an effective SIR and bit loading calculation unit. The effective SIR and bit loading calculation unit sequentially receives all of the possible detection orders in order to decide the optimal detection order. If a specified detection order is input, the effective SIR and bit loading calculation unit applies the detection order to Equations (7) and (8). The Equations (7) and (8) coincide with the equations illustrated in FIG. 2. The effective SIR and bit loading calculation unit calculates the effective SIRs by channels (or by transmitting antennas) by Equation (3) according to the input detection orders, and then calculates the bit loading by channels (or by transmitting antennas) according to the input detection orders. The bit loading corresponds to the modulation rate to be used by channels (or by transmitting antennas).

An example of the effective SIR and the bit loading calculated by detection orders by the effective SIR and the bit loading calculation unit is shown in FIG. 2. In FIG. 2, the numerals inscribed in parentheses in a detection order field correspond to the indexes of the transmitting antennas. The first detection order is to select the second transmitting antenna after the first transmitting antenna is selected, and the second detection order is to select the first transmitting antenna after the second transmitting antenna is selected. In an effective SIR field, the values in parentheses indicate the effective SIRs by transmitting antennas measured by the corresponding detection orders. In a bit loading field, $M_{11}$ indicates a bit loading value for a channel connected from the first transmitting antenna to the first receiving antenna, and $M_{12}$ indicates a bit loading value for a channel connected from the second transmitting antenna to the first receiving antenna. Also, $M_{22}$ indicates a bit loading value for a channel connected from the second transmitting antenna to the second receiving antenna, and $M_{21}$ indicates a bit loading value for a channel connected from the first transmitting antenna to the second receiving antenna.

The bit loading pattern obtained through the above-described bit loading is output from the effective SIR and bit loading calculation unit. Also, the effective SIR and bit loading calculation unit decides the optimal detection order by applying to Equation (7) the effective SIRs and the modulation rates of the respective channels (or the transmitting antennas) by detection order.

C. Embodiment for Deciding an Optimal Detection Order

Hereinafter, an embodiment in which certain experimental values are substituted in the present invention as described above will be explained. It is assumed that the four channels formed by the two transmitting antennas and the two receiving antennas are provided. For example, it is assumed that channel matrixes of 2×2 channels are given by Equations (9) and (10).

$$\text{Case 1}: H = \begin{bmatrix} 0.2499 + 0.3386i & -0.2512 + 0.0136i \\ 0.5728 - 0.8538i & 0.7212 + 0.2508i \end{bmatrix} \quad (9)$$

$$\text{Case 2}: H = \begin{bmatrix} -0.2017 + 0.7528i & 1.1604 + 0.0031i \\ 0.0690 - 0.3836i & -1.1419 + 0.4829i \end{bmatrix} \quad (10)$$

It is assumed that the two examples shown in Equations (9) and (10) are channel matrixes in different channel environments. Two possible detection orders exist. That is, a forward ordering detection and a reverse ordering detection exist. The forward ordering detection is used to first select the transmitting antenna having a larger value between the effective SIR measured by the signal from the first transmitting antenna and the effective SIR measured by the signal from the second transmitting antenna. The reverse ordering detection is used to select the transmitting antenna having a smaller value between the effective SIRs measured by the signals from the first and second transmitting antennas.

The operation of performing the forward ordering detection by the channel matrix of the first case shown in Equation (9) will be explained with reference to Table 1 below. At the first step, the effective SIR corresponding to the first transmitting antenna is measured as "0.0912", and the effective SIR corresponding to the second transmitting antenna is measured as "0.048". The channel that corresponds to the first transmitting antenna indicating a larger effective SIR value between the two effective SIR values is selected. At the second step, the signal from the first transmitting antenna is removed, and then the effective SIR by the signal from the second transmitting antenna is obtained. The effective SIR obtained as above is "0.6463". By performing the bit loading of the effective SINRs by channels so that the total allocated bits become four bits, two bits are allocated to each of the two channels.

The operation of performing the reverse ordering detection by the channel matrix of the first case shown in Equation (9) will be explained with reference to Table 1 below. At the first step, the effective SIR corresponding to the first transmitting antenna is measured as "0.0912", and the effective SIR corresponding to the second transmitting antenna is measured as "0.048" in the same manner as the forward ordering detection. The channel that corresponds to the second transmitting antenna indicating a smaller effective SIR value between the two effective SIR values is selected. At the second step, the signal from the second transmitting antenna is removed, and then the effective SIR by the signal from the first transmitting antenna is obtained. The effective SIR obtained as above is "1.2343". According to the effective SINRs for the respective channels obtained as above, the total SIR will be larger than that obtained by the forward ordering detection. The total SIR obtained by the forward ordering detection is "0.0912+0.6463=0.7375", and the total SIR obtained by the reverse ordering detection is "0.048+1.2343=1.2823". However, the largest SIR (=1.2343) from among the effective SIRs (0.0912, 0.6463, 0.048 and 1.2343) is obtained by the reverse ordering detection, and the smallest SIR (=0.048) from among the effective SIRs (0.0912, 0.6463, 0.048 and 1.2343) is also obtained by the reverse ordering detection. By performing the bit loading of the effective SINRs of the respective channels obtained by the reverse ordering detection so that the total allocated bits become four bits, four bits are allocated to the channel (i.e., the first transmitting antenna) having a relatively large SIR, and a zero bit is allocated to the channel (i.e., the second transmitting antenna) having a relatively small SIR.

The operation in the case of performing the forward ordering detection by the channel matrix of the second case shown in Equation (10) will be explained with reference to Table 1 below. At the first step, the effective SIR corresponding to the first transmitting antenna is measured as "0.1069", and the effective SIR corresponding to the second transmitting antenna is measured as "0.4060". The channel that corresponds to the second transmitting antenna indicating a larger effective SIR value between the two effective SIR values is selected. At the second step, the signal from the second transmitting antenna is removed, and then the effective SIR is obtained by using the signal from the first transmitting antenna. The effective SIR obtained as above is "0.7593".

The operation in the case of performing the reverse ordering detection by the channel matrix of the second case shown in Equation (10) will be explained with reference to Table 1 below. At the first step, the effective SIR corresponding to the first transmitting antenna is measured as "0.1069", and the effective SIR corresponding to the second transmitting antenna is measured as "0.4060". The channel that corresponds to the first transmitting antenna indicating a smaller effective SIR value between the two effective SIR values is selected. At the second step, the signal from the first transmitting antenna is removed, and then the effective SIR is obtained by using the signal from the second transmitting antenna. The effective SIR obtained as above is "2.8837". By performing the bit loading of the effective SINRs of the respective channels obtained as above so that the total allocated bits become four bits, three bits are allocated to the channel having a relatively large SIR, and one bit is allocated to the channel having a relatively small SIR. As described above, the conventional methods search the detection order and allocate the bits in the same manner with respect to the two channels.

In the embodiment of the present invention, a smaller value between proposed criterion values obtained by the forward ordering detection is compared with a smaller value between the proposed criterion values obtained by the reverse ordering detection, and the detection order corresponding to a larger value obtained as a result of comparison is selected. For example, referring to Table 1, in case 1, the proposed criterion values obtained by the forward ordering detection are "0.0456" and "0.0473" with respect to the first and second transmitting antennas, respectively. The proposed criterion values obtained by the reverse ordering detection are "No Trans" and "0.1234" with respect to the first and second transmitting antennas, respectively. The smaller criterion value of "0.0456" is selected at the forward ordering detection, and the smaller criterion value of "0.1234" is selected at the reverse ordering detection. The two smaller values are compared with each other, and the relatively large value of "0.1234" is selected. Consequently, in case 1, the reverse ordering detection that includes "0.1234" as the criterion value is selected as the optimal detection order. In case 1, the obtained average error probability for the forward ordering detection and the reverse ordering detection is "0.0571" as shown in Table 1, and thus it can be recognized that the reverse ordering detection has the low error probability.

Referring to Table 1, in case 2, the proposed criterion values obtained by the forward ordering detection are "0.1015" and "0.0829" with respect to the first and second transmitting antennas, respectively. Also, the proposed criterion values obtained by the reverse ordering detection are "0.0534" and "0.2112" with respect to the first and second transmitting antennas, respectively. The smaller criterion value of "0.0829" is selected as the forward ordering detection, and the smaller criterion value of "0.0534" is selected as the reverse ordering detection. Thereafter, the two smaller values are compared with each other, and the relatively large value of "0.0829" is selected as the optimal detection order. In case 2, the obtained average error probability for the forward ordering detection and the reverse ordering detection is "0.0373" as shown in Table 1, and thus it can be recognized that the forward ordering detection has the low error probability.

The above-described examples can be recognized through Table 1 that shows the operation principle of the architecture proposed according to the present invention.

According to the architecture proposed according to the present invention, the detection order can be selected based on Equation (8) except for case of no transmission. In this case, the reverse ordering is selected for the channel of Case 1 and the forward ordering is selected for the channel of the Case 2, so that the error probability that is lower than that obtained by the conventional architecture can be obtained.

TABLE 1

| Detection | | Effective SIR | | Bit | Proposed | Average |
|---|---|---|---|---|---|---|
| | Order | ANT#1 | ANT#2 | Loading | Criterion | Error |
| Case 1 | Forward | 1 | 0.0912 | 0.0478 | BPSK | 0.0456 | 0.1113 |
| | | 2 | — | 0.6463 | 8PSK | 0.0473 | |
| | Reverse | 1 | 0.0912 | 0.0478 | No Trans | No Trans | 0.0571 |
| | | 2 | 1.2343 | — | 16QAM | 0.1234 | |
| Case 2 | Forward | 1 | 0.1069 | 0.4060 | QPSK | 0.1015 | 0.0373 |
| | | 2 | 0.7593 | — | QPSK | 0.0829 | |
| | Reverse | 1 | 0.1069 | 0.4060 | BPSK | 0.0534 | 0.0473 |
| | | 2 | — | 2.8837 | 8PSK | 0.2112 | |

The experimental results according to the architecture proposed according to the present invention will be explained. Table 2 below shows the experimental environment.

TABLE 2

| | |
|---|---|
| Bit loading Algorithm | Chow's algorithm |
| Modulation | No Trans. BPSK, QPSK, 8PSK, 16QAM |
| Detection | ZF-SIC |
| Antenna Configuration | 2by2, 3by3 |
| Channel Model | Rayleigh flat fading |

Figure 3:
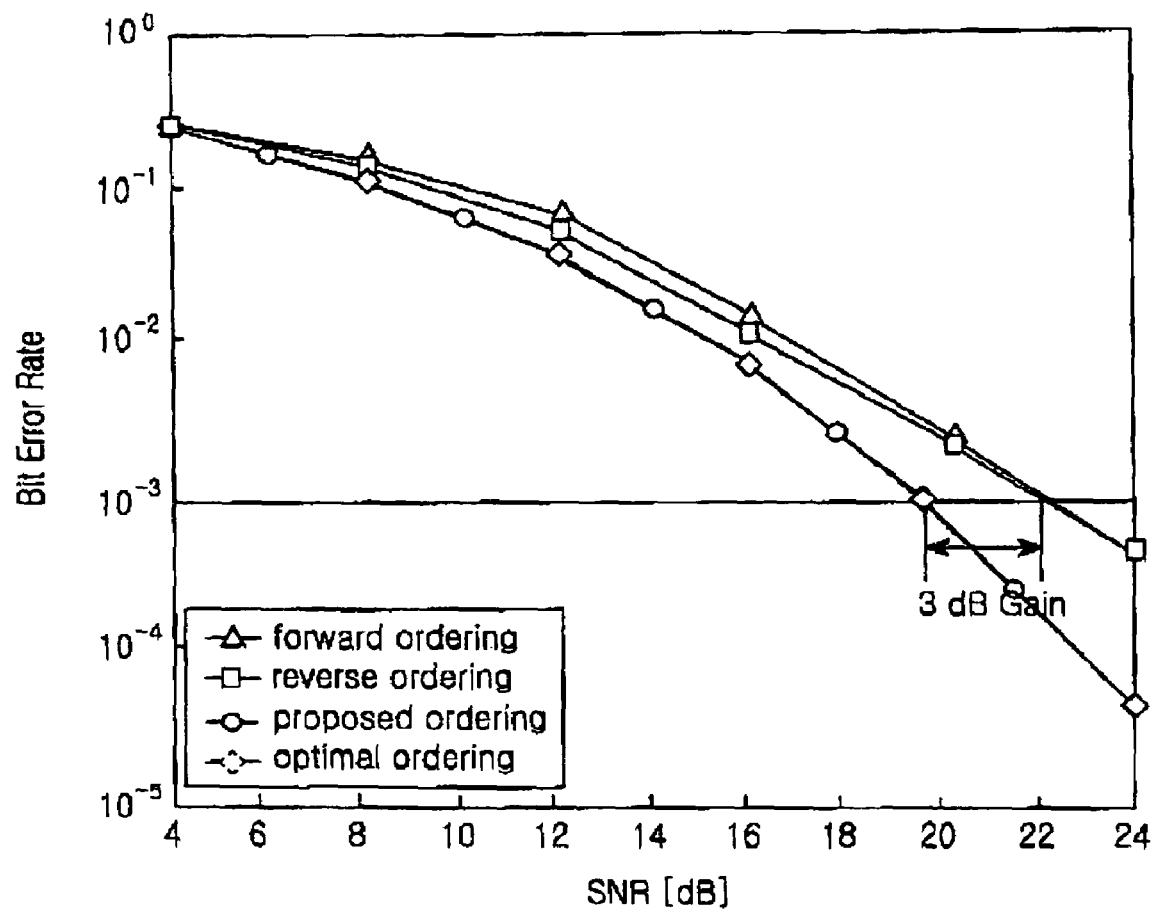
FIGS. 3 and 4 are graphs illustrating experimental results of bit error probabilities when the detection order architecture according to an embodiment of the present invention is applied.
Figure 4:
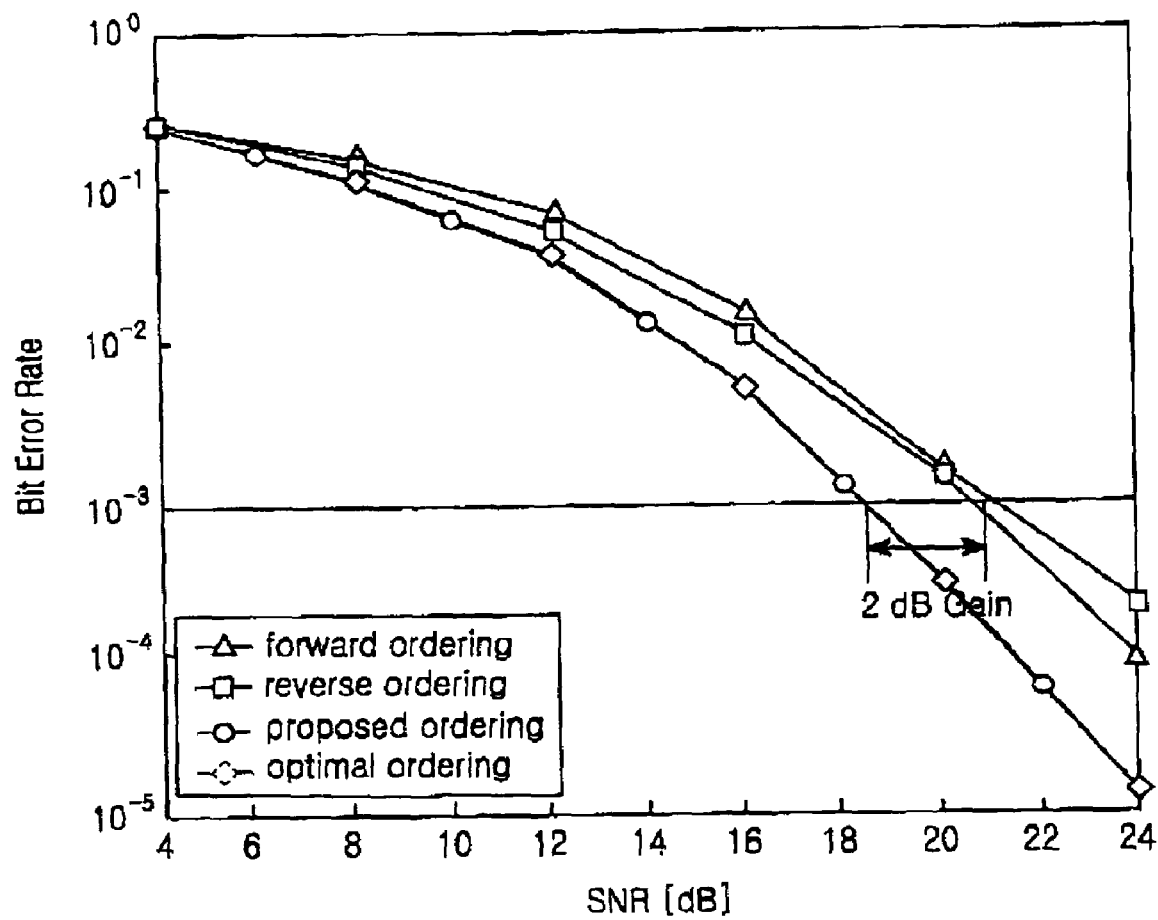

In the experiment performed in the environment given as in Table 2, equal power is allocated to the respective channels, and the use of the adaptive modulation rate is considered. FIG. 3 illustrates the bit error probabilities according to the detection orders in the 2*2 SM-MIMO system employing the adaptive modulation rate in the experimental environment of Table 2. FIG. 4 illustrates the bit error probabilities according to the detection orders in the 3*3 SM-MIMO system employing the adaptive modulation rate. Through FIGS. 3 and 4, it can be recognized that the architecture proposed according to the present invention is almost equal to the optimal ordering architecture that minimizes the average error probability.

It can be recognized that in the case of 2*2 antennas based on the error probability of $10^{-3}$, the proposed architecture has a gain of about 3 dB in comparison to the conventional architecture, and in the case of 3*3 antennas, the proposed architecture has a gain of about 2 dB in comparison to the conventional architecture. In the case of 3*3 antennas, if only the forward ordering and the reverse ordering are considered in order to reduce the number searches, the performance is lowered in comparison to that obtained from a full search. However, the proposed architecture can obtain an SNR gain of about 1.3 dB in comparison to the conventional architecture.

As described above, according to the present invention, the detection order that maximizes the channel, in which the multiplication of the minimum symbol distance for each modulation rate and the effective SINR becomes minimum, in the system having the equal power and the adaptive modulation rate only. The average error probability is minimized to improve the performance of the system. In the present invention, the detection order that can reduce the error probability can be decided irrespective of the bit loading algorithm, and thus the performance that is equal to the optimal architecture can be obtained with a small amount of calculation.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for deciding a signal detection order that minimizes an error probability in an SM-MIMO (Spatial Multiplexing Multiple Input Multiple Output) system using an equal power and adaptive modulation rate for a plurality of antennas, the method comprising the steps of:

obtaining an effective SINR (Signal to Interference pulse Noise Ratio), in an effective SIR (Signal to Interference Ratio) and bit loading calculation unit, for each detection order;

selecting from among the detection orders, in said effective SIR and bit loading calculation unit, the detection order that maximizes a channel, in which a product of a minimum symbol distance for each modulation rate and the effective SINR becomes minimum through performance of a bit allocation with respect to the detection orders;

receiving signals through the plurality of antennas in accordance with the selected detection order; and wherein the selection of the detection order is performed by $$\max_{i(detection\ order)} \left( \min_{k(T \times antenna)} \frac{g_{M_{ik}} \gamma_{ik}}{r_i} \right)$$

where, i denotes an index of the detection order, k denotes an index of the transmitting antenna, $g_M$ denotes a constant corresponding to the minimum symbol distance given according to the modulation rate, $\gamma$ denotes a signal to interference ratio by the channel, and r denotes the effective number of substreams which load at least one bit.

2. The method as claimed in claim 1 wherein if the number of antennas is increased, the detection order that maximizes the channel, in which the product of the minimum symbol distance for each modulation rate and the effective SINR becomes, is selected with respect to the forward order and the reverse order from among the detected orders.

3. An apparatus for receiving signals that minimizes an error probability in an SM-MIMO (Spatial Multiplexing Multiple Input Multiple Output) system using an equal power and adaptive modulation rate for a plurality of antennas, the apparatus comprising:

an effective SIR (Signal to Interference Ratio) and bit loading calculation unit for sequentially inputting each detection order, obtaining an effective SINR (Signal to Interference pulse Noise Ratios) for each transmitting antenna based on the input detection orders, and selecting from among the detection orders the detection order that maximizes a channel, in which a product of a minimum symbol distance for each modulation rate and the effective SINR becomes minimum through performance of a bit allocation with respect to the detection orders;

a V-BLAST (Vertical Bell Lab LAyered Space Time) unit for receiving the signals through the plurality of antennas in accordance with the detection order selected by the effective SIR and bit loading calculation unit; and wherein the selection of the detection order is performed by $$\max_{i(detection\ order)} \left( \min_{k(T \times antenna)} \frac{g_{M_{ik}} \gamma_{ik}}{r_i} \right)$$

where, i denotes an index of the detection order, k denotes an index of the transmitting antenna, $g_M$ denotes a constant corresponding to the minimum symbol distance given according to the modulation rate, $\gamma$ denotes a signal to interference ratio by the channel, and r denotes the effective number of substreams which load at least one bit.

4. The apparatus as claimed in claim 3 wherein if the number of antennas is increased, the detection order that maximizes the channel, in which the product of the minimum symbol distance for each modulation rate and the effective SINR becomes minimum, is selected with respect to the forward order and the reverse order from among the detected orders.

5. A method for deciding a signal detection order that minimizes an error probability in an SM-MIMO (Spatial Multiplexing Multiple Input Multiple Output) system using an equal power and adaptive modulation rate for a plurality of antennas, the method comprising the steps of:

calculating reference values, in an effective SIR (Signal to Interference Ratio) and bit loading calculation unit, for transmitting antennas for each detection order by $$\frac{g_{M_{ik}} \gamma_{ik}}{r_i}$$

where, i denotes an index of the detection order, k denotes an index of the transmitting antenna, $g_M$ denotes a constant corresponding to the minimum symbol distance given according to the modulation rate, $\gamma$ denotes a signal to interference ratio by the channel, and r denotes the effective number of substreams which load at least one bit;

selecting the smallest reference value from among the reference values calculated for transmitting antennas for the respective detection orders;

selecting the largest reference value from among the reference values selected corresponding to the respective detection orders; and deciding the detection order for which the largest selected reference value is obtained as the final detection order by said effective SIR and bit loading calculation unit; and receiving signals through the plurality of antennas in accordance with the selected detection order.

6. An apparatus for receiving signals that minimizes an error probability in an SM-MIMO (Spatial Multiplexing Multiple Input Multiple Output) system using an equal power and adaptive modulation rate for a plurality of antennas, the apparatus comprising:

an effective SIR (Signal to Interference Ratio) and bit loading calculation unit for calculating reference values for transmitting antennas for each detection order by $$\frac{g_{M_{ik}} \gamma_{ik}}{r_i}$$

where, i denotes an index of the detection order, k denotes an index of the transmitting antenna, $g_M$ denotes a constant corresponding to the minimum symbol distance given according to the modulation rate, $\gamma$ denotes a signal to interference ratio by the channel, and r denotes the effective number of substreams which load at least one bit, selecting the smallest reference value from among the reference values calculated for transmitting antennas for the respective detection orders, and deciding the detection order for which the largest reference value from among the reference values selected corresponding to the respective detection orders is obtained as the final detection order; and a V-BLAST (Vertical Bell Lab LAyered Space Time) unit for receiving the signals through the plurality of antennas in accordance with the detection order decided by the effective SIR and bit loading calculation unit.

* * * * *